3,256,099
PECTIN JELLY AND DRY BASE THEREFOR
Harold Rosenthal, Newtonville, and Daniel Casper, Wakefield, Mass., assignors to General Foods Corporation, White Plains, N.Y., a corporation of Delaware
No Drawing. Filed June 6, 1962, Ser. No. 200,312
10 Claims. (Cl. 99—132)

This invention relates to a novel jelly composition and a base from which that composition is formed. More specifically, it relates to a jelly particularly adapted for use in pastry compositions which conventionally incorporate jellies therein.

A wide variety of pastry products that have achieved broad consumer acceptance employ as part of their structure a jelly composition which is deposited between or on other portions of the pastry product and which is not intimately commingled with those other portions. Exemplarily, jelly doughnuts have a jelly center completely surrounded by a baked dough; a wide variety of Danish pastries have jelly incorporated in varying amounts therein. Either the surface of the pastry may be formed, in part, from jelly, or the jelly may be completely enclosed within the dough structure of the pastry. Such pastry products suffer from the difficulty of maintaining proper jelly consistency during the baking of the product, jelly generally lacking resistance to maintenance of its form during subjection to oven temperatures employed in baking pastry products, e.g., about 350° F. for a period of about 25 minutes. Lack of resistance to oven temperatures results in flattening out of the jelly and weeping thereof, whereupon the jelly or serum extruded from the jelly runs over the area in which it was to have been confined and, in a fluid condition, may penetrate voids in the dough portion of the product and make the product soggy. Weeping and consequent undesirable spreading of the jelly is a major problem in the preparation of jelly pastry products.

The present invention solves the problem of jelly breakdown in the course of baking by employing two ingredients each of which independently plays an important part in the formation of jelly which will have substantial resistance to oven temperatures of about 350° F., and which, in combination, result in a jelly having temperature-resistance characteristics which are markedly superior without resulting in a highly viscous, caramel-like jelly material which, while it may have high oven resistance, has a gummy, undesirable mouth feel and is not suitable for use in jelly pastries. In order to effect such superior oven resistance, citrus peel and meal selected from the group consisting of cereal meals, soy meal, tapioca meal and potato meal are employed in the jelly composition to be used in conjunction with the dough of the pastry product, and in a substantially dry base used in forming the jelly composition.

The citrus peel which is employed in the jelly composition is used in a quantity sufficient to give a grainy or pebbly character to the jelly. In order to deposit quantities of jelly in individual pastries prior to baking so that the jelly will be in a proper position in the finished product, the continuous gel which was formed when the jelly was gelled must be broken up. Such breaking up of such a relatively large batch of jelly may be done manually. Further, the jelly is conventionally placed in a syringe from which it is squeezed into proper location on the unbaked pastry product. A more mechanized method of applying the jelly to the pastry product is to pump the jelly from a reservoir into its proper location in each individual pastry product. During such working of the jelly to bring it into proper position, it will be apparent that the gel which was formed when the jelly set will be broken up. Breaking up of the continuous gel results in weeping of the jelly and, more importantly, brings about a marked lack of resistance to oven temperatures in the jelly when the pastry product with the worked jelly in place is subjected to oven temperatures.

The incorporation of citrus peel into the jelly composition in such quantities as will give a pebbly or grainy structure to the jelly appears to remedy to a large extent the tendency of the gel to break down upon being worked or whipped. When jelly having pebbly or grainy characteristics is pumped or squeezed into position, the jelly seems to act as though each small bead of jelly which surrounds a particle of citrus peel or agglomerates of such particles, forms a continuous gel of its own. Thus, the jelly exhibits the oven-resistance characteristics of a continuous, unbroken gel and does not have the inferior characteristics which are exhibited by a discontinuous gel produced by working or whipping jelly.

The incorporation of cereal, soy, tapioca or potato meal into the jelly composition results in superior oven-resistance characteristics being imparted to the jelly. The precise reason for the improved oven-resistance characteristics by virtue of the incorporation of the meal is not known with assurance. It has been suggested that the meal absorbs part of the water of the jelly and, in effect, stiffens the gel structure so that it will not weep or flatten as easily under the application of heat. Another theory is that, since the meal is a vegetable material, some of the pectin which it contains may form a bond with the pectin in the jelly and, by virtue of that bond, resist flow under oven temperatures. In any event, cereal and other meals have been found to improve substantially the oven resistance of a jelly composition during baking of a pastry product.

The citrus peel should optimally be distributed uniformly throughout the jelly composition. In this way there will not be substantial volumes of the jelly which have no citrus peel so that these volumes will form a discontinuous gel. There should not be large agglomerates of peel in concentrated portions of the jelly composition, in which case the jelly will tend to be lumpy and uneven. Among those peels which are suitable for use according to this invention are peels of lemon, orange, grapefruit, tangerine, and kumquat, but it is apparent that any peel from the fruit of the citrus variety will be effective in providing material which will form centers for small globules of individual, continuous gels. The size of these particles will be varied in accordance with the particular jelly with which they are to be blended and also in accordance with the degree of working to which the jelly is to be subjected. However, it has been found that particles of citrus peel which are of a size sufficient to pass a screen having about 30 to 300 mesh per inch are operative. Preferably, the size of the particles of citrus peel will be from 60 to 200 mesh, and an optimum particle size has been found to be 100 mesh. The requisite pebbly or grainy characteristic of the jelly has been found to be attained when quantities of citrus peel constituting about 0.3 to 1.0 percent of the total solid content of the jelly composition are utilized.

The cereal, soy, tapioca or potato meal, or flour, which is used to improve the oven characteristics of the jelly composition of this invention will include all cereal meals in common use. Thus, oatmeal, wheat meal, corn meal, rice meal, barley meal, rye meal, and like cereal materials have been found to yield substantial improvement in the oven-resistance characteristics of a jelly composition. Of those meals which have been tested, oatmeal gave highly advantageous results, while tapioca meal, being high in starch, was acceptable but probably the least desirable. Potato meal gave good results. Tests made with pure starch showed that this material did not aid the oven-resistance characteristics of the jelly. Further, purely cellulosic materials such as methylcellulose (Methocel brand) and totally extracted beet pulp, did not improve the oven characteristics. Generally, as the composition progressed toward pure cellulose, the less it improved the oven characteristics of the jelly.

The sizes of particles of cereal, soy, tapioca and potato meals which were found utilizable were approximately the same as those which were most advantageous for the citrus peel. Thus, the particle size varied from about 30 to 300 U.S. mesh, preferably 60 to 200 U.S. mesh. The quantity of meal in the final jelly composition was advantageously found to be about that for the citrus peel, namely, from about 0.3 to 1.0 percent by weight of total solids content of the jelly. The principal requirement for the quantity of meal to be utilized was that the amount used be sufficient to improve substantially the oven resistance of the jelly. So far as particle size is concerned, particles which were too fine tended to clump, while particles which were too large resulted in a lumpy product which did not have a jelly-like appearance.

The citrus peel and cereal, soy, tapioca or potato meal are preferably supplied to bakers of pastry products in a dry form which, together with pectin, is incorporated with other conventional ingredients to form a jelly. The baker takes the dry materials as supplied and forms his own jelly from them, utilizing the standard materials which he has on hand and those flavors which he will use in the jelly. In its most useful form, therefore, the base which is supplied to bakers and which is substantially dry will comprise citrus peel, cereal, soy, tapioca or potato meal, and pectin. The base is formulated so that, upon the addition of a certain quantity of the base to the other materials used to form the jelly, the baker will be furnishing the proper quantities of pectin, citrus peel and meal to form a jelly which is a strong gel, which has a pebbly structure and which has superior oven characteristics.

A typical base in substantially dry form which can be furnished to bakers of pastries is one which contains eight parts of pectin to seven parts of citrus peel to seven parts of meal. The various quantities of ingredients of this base will vary, for example, in accordance with the strength of the gel which the baker desires to form. Increase or decrease in the quantity of pectin will vary the gel strength. Where the jelly is not to be subjected to strenuous working, it may be advantageous to lower the quantity of citrus peel which is incorporated into the jelly base. The amount of meal used is also variable, since some degree of flow of the jelly composition may be desirable and, indeed, necessary. If the jelly is to flow so that it will fill the parameters of a confined area which holds the jelly, it may be desirable that the jelly flow to an extent necessary to permit it to fill its confines but not to such an extent as will make it weep or liquify excessively so that it overflows its confines or enters voids in the pastry and makes the pastry soggy. Thus, the ratio of the jelly base to other ingredients is subject to change according to the particular use which is to be made of the base and the preference of the individual baker. This invention contemplates the formation of a baker's jelly base which includes citrus peel and pectin; cereal, soy, tapioca or potato meal and pectin; and citrus peel, cereal, soy, tapioca or potato meal and pectin.

The quantity of jelly base which will be utilized by the baker in preparing a batch of jelly will necessarily be such that there is sufficient pectin to form a gel, sufficient quantities of citrus peel to give a grainy structure to the jelly, and sufficient quantities of meal to provide the desired degree of oven resistance in the gel. The following examples of jelly compositions will serve to illustrate typical jelly compositions which can be formed in accordance with this invention.

*Example I*

Pectin (150 grade)—8 g.
Lemon peel—7 g. (100 mesh)
Oatmeal—7 g. (100 mesh)
Cane sugar—367 g.
Corn syrup (80% solids)—762 g.
Flavor—13.4 cc.
Color to suit
Water—500 cc.

The above formula was cooked down to about 65% solids and gelled with 7.3 cc. of citric acid (50% solution) or enough to adjust to a 2.9 to 3.2 pH.

*Example II*

The formulation of Example I was repeated except that 7 g. of potato meal (so-called Instant Mashed Potatoes, Minute Brand) was substituted for the oatmeal. By potato meal is meant raw, cooked or partially cooked potatoes in particulate form, e.g., flake, chunk or granule, and having a relatively low moisture content.

*Example III*

Pectin (150 grade)—0.2 lb.
Orange peel—0.2 lb. (80 mesh)
Wheat flour—0.2 lb. (80 mesh)
Cane sugar—9.7 lbs.
Corn syrup (80% solids)—15.6 lbs.
Color and flavor—0.1 lb.
Water—14.0 lbs.

The above formula was cooked down to about 65% solids and gelled with enough citric acid to bring the pH to 2.9 to 3.2.

It will be apparent from the above examples that the particle size of the citrus peel and the meal has been kept the same and approximates the particle size of commercial, 150 grade pectin. Uniformity of particle size is not necessary, but when the base is to be shipped in commerce, it has been found that where the particles sizes vary greatly, the particles will tend to separate on shipment into a non-homogeneous mixture. When it is desired to keep the particles in a jelly base in a thoroughly intermingled form, it is necessary to have the particle size of pectin approximately the same as that of the citrus peel and the meal. While the examples have utilized pectin standardized with dextrose to 150 grade, it will be obvious that variations in the grade of pectin will require more or less pectin to be used. In forming the jelly composition from the base, the base may be added in many ways all of which will prove efficient so long as the materials of the base are well distributed, preferably uniformly distributed throughout the jelly solution and, subsequently, the gelled composition. A preferred manner of adding the jelly base is to blend it with a quantity of the sugar and sift the mixture into water at about 120° F. with agitation. This will result in adequate distribution of the ingredients of the base throughout the solution.

It will be apparent that those skilled in this art will find obvious various alterations and modifications in the invention as described herein and set forth in the examples without departing from the scope of the invention. All such alterations and modifications are desired to be included within the purview of this invention, which is to be limited only by the scope of the following, appended claims.

What is claimed is:

1. A pectin jelly having distributed throughout its volume citrus peel of a particle size of 60 to 200 mesh, said citrus peel being present in an amount sufficient to give a grainy character to the jelly.

2. A pectin jelly having dispersed throughout its volume meal selected from the group consisting of cereal, soy, tapioca and potato meals of a particle size which passes a screen having about 30 to 300 mesh per inch, said meal being present in an amount sufficient to substantially increase the resistance of said jelly to flow under pastry baking oven temperatures.

3. A pectin jelly as claimed in claim 2, in which said meal has a particle size of about 60 to 200 mesh.

4. A pectin jelly as claimed in claim 2, in which said meal constitutes about 0.3 to 1.0 percent of the total solids content of said jelly.

5. A pectin jelly having dispersed substantially uniformly throughout its volume citrus peel of a particle size which passes a screen having about 30 to 300 mesh per inch, said citrus peel being present in an amount sufficient to give a grainy character to the jelly, and meal selected from the group consisting of cereal, soy, tapioca and potato meals of a particle size which passes a screen having about 30 to 300 mesh per inch, said meal being present in an amount sufficient to substantially increase the resistance of said jelly to flow under pastry baking oven temperatures.

6. A pectin jelly as claimed in claim 5, in which said citrus peel and said meal are present in approximately equal amounts.

7. A pectin jelly as claimed in claim 6, in which said peel and said meal are each present in about 0.3 to 1.0 percent of the total solids content of said jelly.

8. A substantially dry pectin jelly base, comprising a mixture of citrus peel of a particle size sufficient to pass a screen having about 30 to 300 mesh per inch, meal selected from the group consisting of cereal, soy, tapioca and potato meals of a particle size sufficient to pass a screen having about 30 to 300 mesh per inch, and pectin.

9. A substantially dry pectin jelly base as claimed in claim 8 in which said citrus peel and said meal are of approximately the same particle size.

10. A substantially dry pectin jelly base as claimed in claim 8, in which said citrus peel and said meal are present in approximately equal amounts.

References Cited by the Examiner
UNITED STATES PATENTS

| | | | |
|---|---|---|---|
| 1,692,040 | 11/1928 | Hulburt | 99—129 |
| 1,795,980 | 3/1931 | Wahl | 99—132 X |
| 2,157,485 | 5/1939 | Forkner. | |
| 2,161,238 | 6/1939 | Stanton | 99—129 |
| 2,219,026 | 10/1940 | Webb et al. | 99—204 |
| 2,556,579 | 6/1951 | Forkner | 99—102 |
| 2,557,050 | 6/1951 | Hassid | 99—132 |
| 2,563,996 | 8/1951 | Edgar et al. | 99—102 X |
| 2,590,647 | 3/1952 | Pettibone. | |
| 2,976,159 | 3/1961 | Swisher | 99—102 X |
| 3,112,202 | 11/1963 | Wadsworth | 99—129 X |

FOREIGN PATENTS
385,200   12/1932   Great Britain.

OTHER REFERENCES
Bisno: "Thickeners Used in Pie Fillings," Baker's Digest, April 1951, pp. 29–34, page 30 relied on.

A. LOUIS MONACELL, *Primary Examiner.*

BEATRICE H. STRIZAK, *Examiner.*

JOSEPH M. GOLIAN, *Assistant Examiner.*